(12) United States Patent
Jung et al.

(10) Patent No.: US 7,367,864 B2
(45) Date of Patent: May 6, 2008

(54) METHOD FOR CONTROLLING ACCESSORIES OF A MOTOR VEHICLE

(75) Inventors: Merten Jung, Munich (DE); Alberto Croci, Munich (DE); Heiko Faust, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/806,452

(22) Filed: May 31, 2007

(65) Prior Publication Data

US 2007/0232442 A1 Oct. 4, 2007

Related U.S. Application Data

(63) Continuation of application No. PCT/EP2005/012356, filed on Nov. 18, 2005.

(30) Foreign Application Priority Data

Dec. 3, 2004 (DE) .................. 10 2004 058 344

(51) Int. Cl.
*B60W 10/00* (2006.01)
(52) U.S. Cl. ................... 447/34; 477/115; 701/51
(58) Field of Classification Search ........... 477/34, 477/16, 115; 701/51
See application file for complete search history.

(56) References Cited

U.S. PATENT DOCUMENTS

| 4,862,700 A | 9/1989 | Suzuki |
| 6,208,931 B1 | 3/2001 | Schoettle et al. |
| 6,690,137 B2 * | 2/2004 | Iwaji et al. ................. 318/700 |
| 6,886,530 B2 * | 5/2005 | Matischok et al. ......... 123/395 |
| 7,200,476 B2 * | 4/2007 | Cawthorne et al. ........... 701/51 |

FOREIGN PATENT DOCUMENTS

| DE | 197 45 849 A1 | 4/1999 |
| DE | 100 59 708 A1 | 7/2001 |
| DE | 101 26 401 A1 | 11/2002 |
| DE | 102 42 230 A1 | 10/2003 |
| DE | 102 46 058 A1 | 4/2004 |
| EP | 0 601 300 B1 | 6/1994 |
| GB | 2 397 138 A | 7/2004 |

OTHER PUBLICATIONS

International Search Report dated Mar. 21, 2006 including English translation (Five (5) pages).
German Office Action dated Aug. 9, 2005 including English translation (Seven (7) pages).

* cited by examiner

*Primary Examiner*—Ha D. Ho
(74) *Attorney, Agent, or Firm*—Crowell & Moring LLP

(57) ABSTRACT

A method and system for controlling secondary assemblies of a motor vehicle, the motor vehicle having at least one deactivatable secondary assembly which generates a loss torque are provided. The method includes determining the current total loss torque acting on the drive train, determining the deactivation dead time of the at least one deactivatable secondary assembly, estimating the total loss torque resulting after passage of the deactivation dead time, and deactivating the at least one deactivatable secondary assembly if a predefined maximum torque threshold is exceeded by the estimated total loss torque.

14 Claims, 4 Drawing Sheets

METHOD FOR CONTROLLING ACCESSORIES OF A MOTOR VEHICLE

CROSS REFERENCE TO RELATED APPLICATIONS

This application is a continuation of PCT International Application No. PCT/EP2005/012356, filed Nov. 18, 2005, which claims priority under 35 U.S.C. § 119 to German Patent Application No. 10 2004 058 344.7, filed Dec. 3, 2004, the entire disclosures of which are herein expressly incorporated by reference.

BACKGROUND AND SUMMARY OF THE INVENTION

The present invention relates to a method for controlling accessories of a motor vehicle, which act via a loss torque on the drivetrain of the motor vehicle.

Currently, vehicles are equipped, in regard to comfort and security, with ever more and/or ever larger accessories (a.k.a., secondary assemblies) such as the air-conditioning system (air-conditioning compressor), generator, power steering pumps, pumps for chassis stabilization, or the like. All of the secondary assemblies act indirectly or directly as producers of loss torques acting on the drivetrain, in that, because of their operation, in addition to the pure engine drive torque to be applied by the drive unit (e.g., internal combustion engine and/or electric motor) to accelerate the motor vehicle or solely to maintain idle operation without activated secondary assemblies, they load the drive unit with additional torque to be produced (so-called loss torque) for their own operation. In particular, in lower-power motors, the problem thus arises that the drive unit may not meet (or provide) the particular demanded total torque in every operating state. In this meaning, the torque converter of an automatic transmission also acts as a secondary assembly generating a loss torque.

The present invention is based on the object of specifying a method for controlling secondary assemblies of a motor vehicle, which act on the drivetrain of the motor vehicle via a loss torque, which ensures operation of the drive unit in conformity with demand in all operating states of the drive unit, and in particular prevents startup weakening or undesired snapping off (stopping) of the drive unit during idle operation.

The object is achieved according to the present invention by a method for controlling secondary assemblies of a motor vehicle including at least one deactivatable secondary assembly which generates a loss torque. By ascertaining and subsequently monitoring a total loss torque to be expected and possibly deactivating a deactivatable secondary assembly as a function of the monitoring result, secure operation of the drive unit in conformance with demand is ensured in every operating state. To ascertain the fictive total loss torque to be expected, the deactivation dead time (required time which passes from the instant of the deactivation command until the actual beginning of the deactivation procedure) of at least one deactivatable secondary assembly which generates a loss torque (referred to below as a deactivatable secondary assembly) is ascertained. If multiple deactivatable secondary assemblies are provided, at least the shortest deactivation dead time is ascertained. The deactivation dead time may be read out from a stored table of the deactivation dead times for all deactivatable secondary assemblies or from a memory area in the deactivatable secondary assembly itself.

Starting from the currently existing total loss torque (sum of the currently applied loss torques of all (active) secondary assemblies), it is then ascertained what fictive total loss torque (current total loss torque+loss torque of all (active) secondary assemblies after passage of the deactivation dead time of a secondary assembly potentially to be deactivated) would result after passage of the deactivation dead time used as a basis. The fictive total loss torque is estimated, for example, by calculating which torque may be absorbed at most by all participating secondary assemblies upon passage of the deactivation dead time. For this purpose, the currently absorbed torque, the maximum absorbable torque, and the maximum torque gradient are advantageously ascertained for every (active) secondary assembly. Finally, the ascertained total loss torque to be expected is compared to a predefined torque threshold (monitoring) and if the threshold is reached or exceeded, the secondary assembly whose deactivation dead time was used for ascertaining the loss torques of all secondary assemblies is deactivated (shut down).

Other objects, advantages and novel features of the present invention will become apparent from the following detailed description of the invention when considered in conjunction with the accompanying drawings.

DETAILED DESCRIPTION OF THE DRAWINGS

Figure 1:
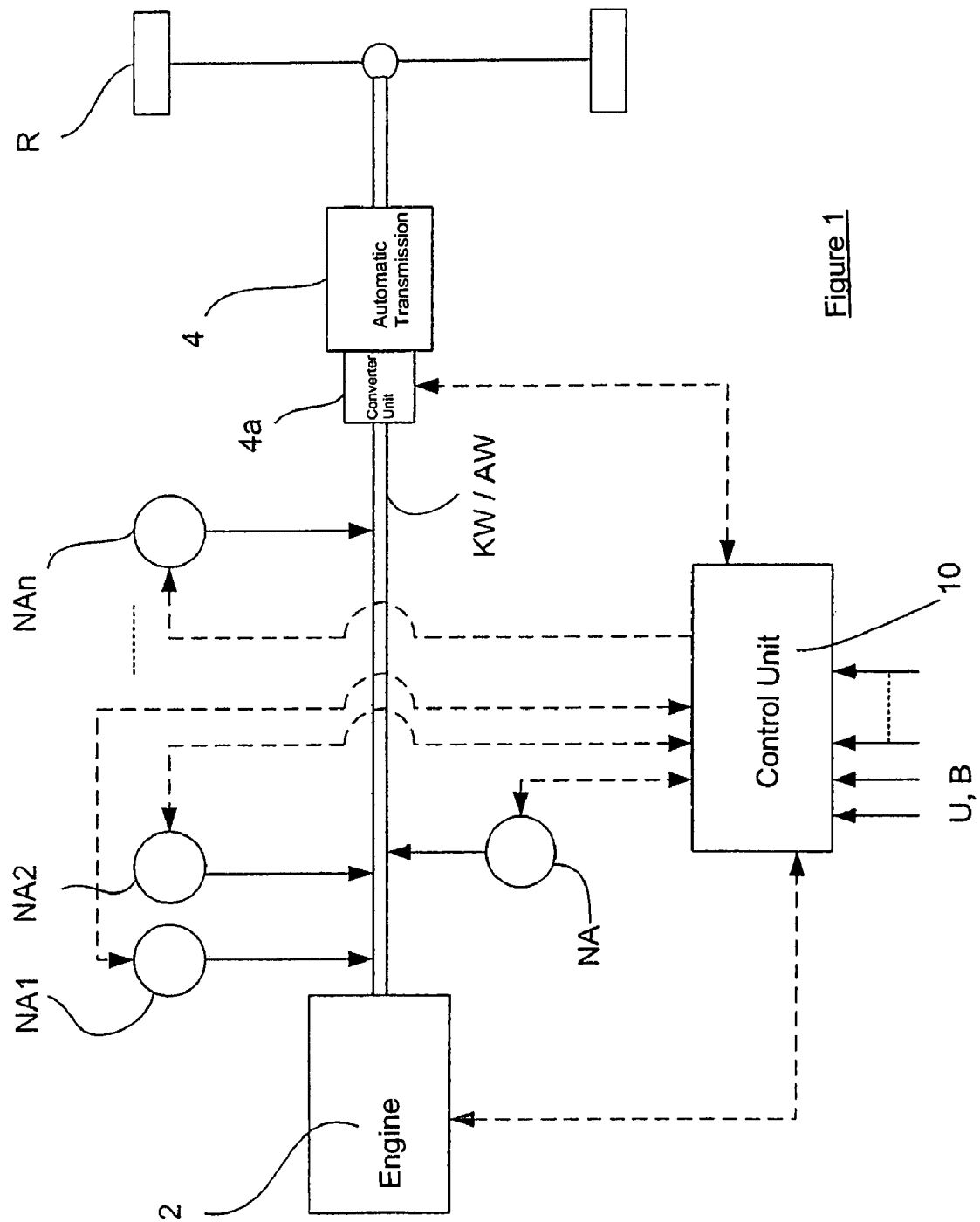
FIG. 1 shows a schematic illustration of the drivetrain of a motor vehicle with secondary assemblies coupled thereto.

FIG. 1 shows the drivetrain of a motor vehicle, including an internal combustion engine 2, an automatic transmission 4 including converter unit 4a, and a crankshaft KW and/or driveshaft AW which connects the drive unit 2 to the automatic transmission 4 and/or to its converter unit 4a. In systems of this type, a positive drive torque is generated by the drive unit 2 implemented as an internal combustion engine (and/or electric motor), which is transmitted via the crankshaft KW and/or driveshaft AW to the transmission 4 and via the transmission to a differential and the driveshafts of the drive wheels R. In addition, the drive unit 2 must also provide a sufficient torque for secondary assemblies NA (in the following, the converter unit 4a is also understood as a secondary assembly generating a loss torque in the meaning of the present invention), which, in case of their operation (secondary assembly active), exert a negative torque (loss torque) on the drivetrain and/or on the drive unit 2 driving the drivetrain. FIG. 1 shows multiple secondary assemblies, in general, non-deactivatable secondary assemblies being identified by NA and deactivatable secondary assemblies being identified by NA1, . . . , NAn. In addition, a control unit 10 is provided, via which the secondary assemblies NA; NA1, . . . , NAn are controlled as a function of the existing environmental and operating conditions U, B. The control unit 10 is implemented in such a way that the deactivatable secondary assemblies NA1, . . . , NAn are activated according to the method according to the present invention.

Figure 2:
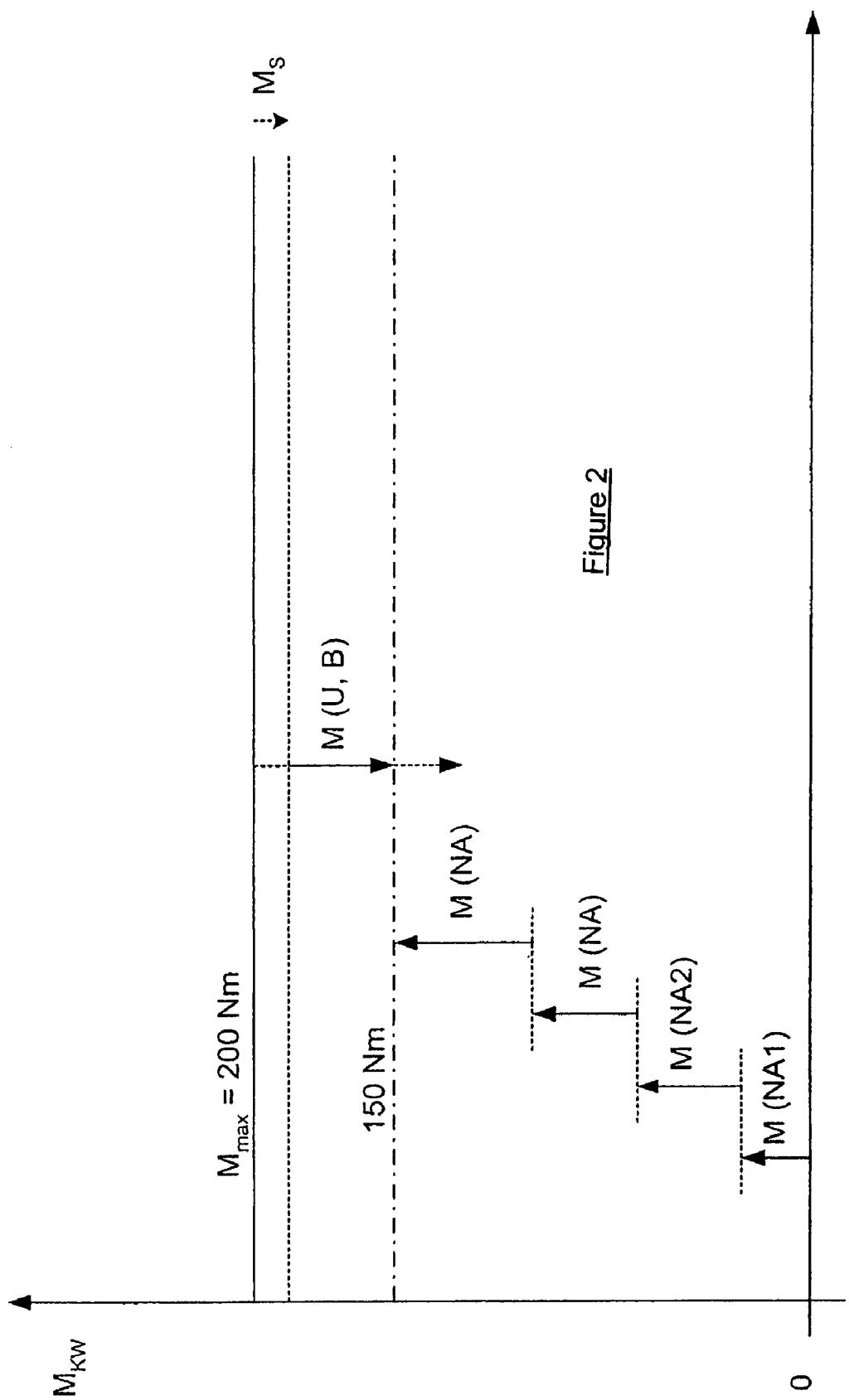
FIG. 2 shows the relationship between a torque generated via a drive unit and loss torques generated via secondary assemblies.

In FIG. 2, the problems of an overload caused by secondary assemblies NA; NA1, . . . , NAn in idle operation of the drive unit 2 are illustrated. For this purpose, it is assumed that in idle operation under defined environmental and operating conditions U, B (standard conditions), a maximum total drive torque of 200 Nm may be provided by the drive unit 2. Furthermore, a total of four secondary assemblies NA are activated, which require a total loss torque of 150 Nm due to their operation—of these, two secondary assemblies NA1, NA2 (e.g., air conditioning system and generator) are implemented as deactivatable secondary assemblies. Theoretically, a residual torque of 50 Nm thus remains to maintain operation of the drive unit 2. Assuming the case that because of environmental conditions U, such as external temperature, geometric height (lack of oxygen content) and operating conditions B, such as engaged gear "D" (forward travel) of the automatic transmission, the provided residual torque of 50 Nm is consumed or even exceeded, it may be that the drive unit 2 cannot maintain its operation and shuts down in an undesired way (so-called "snapping off").

Figure 3:
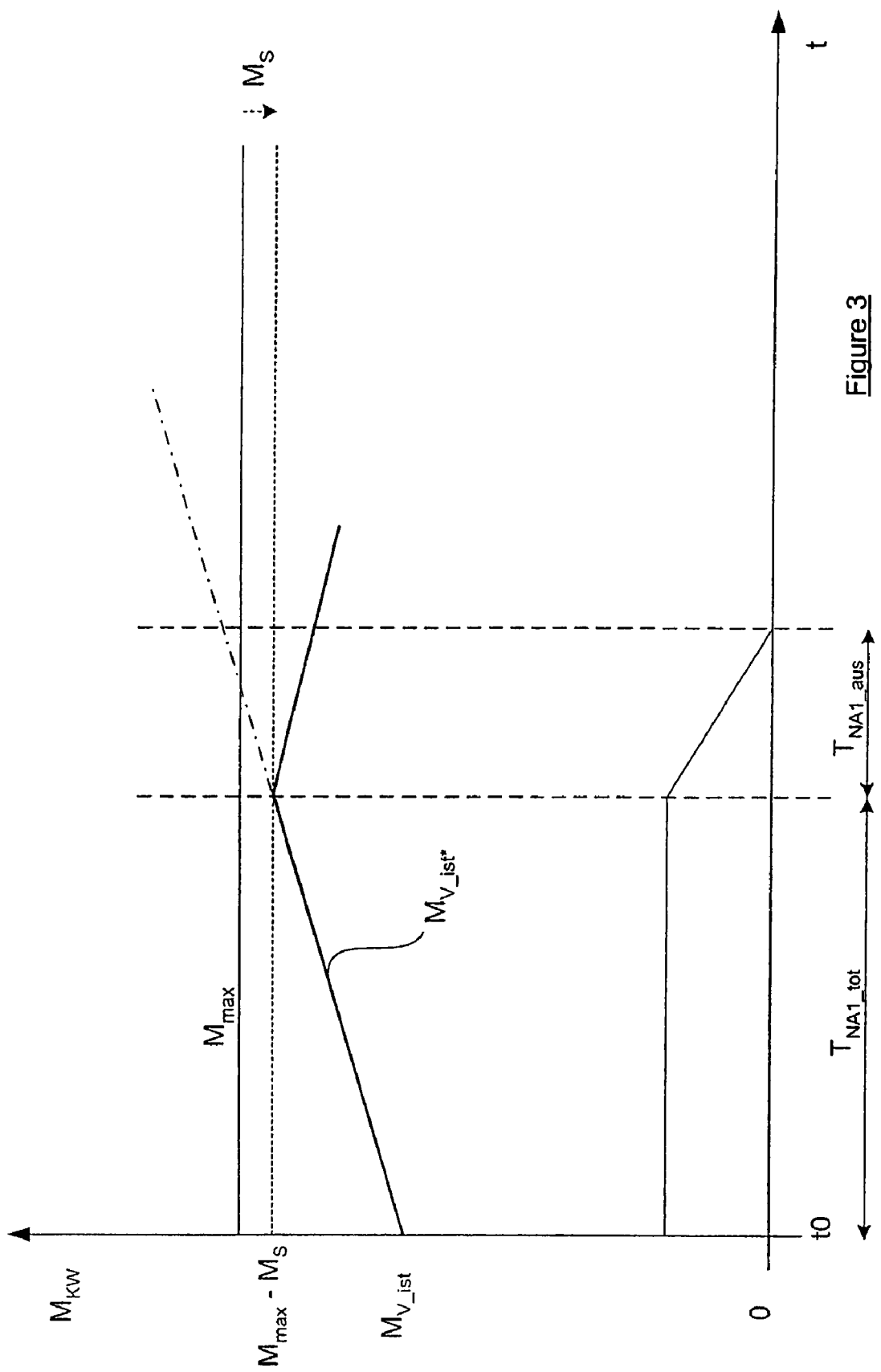
FIG. 3 shows the mode of operation according to the present invention in an exemplary embodiment, illustrating drive torque and loss torques over time.
Figure 4:
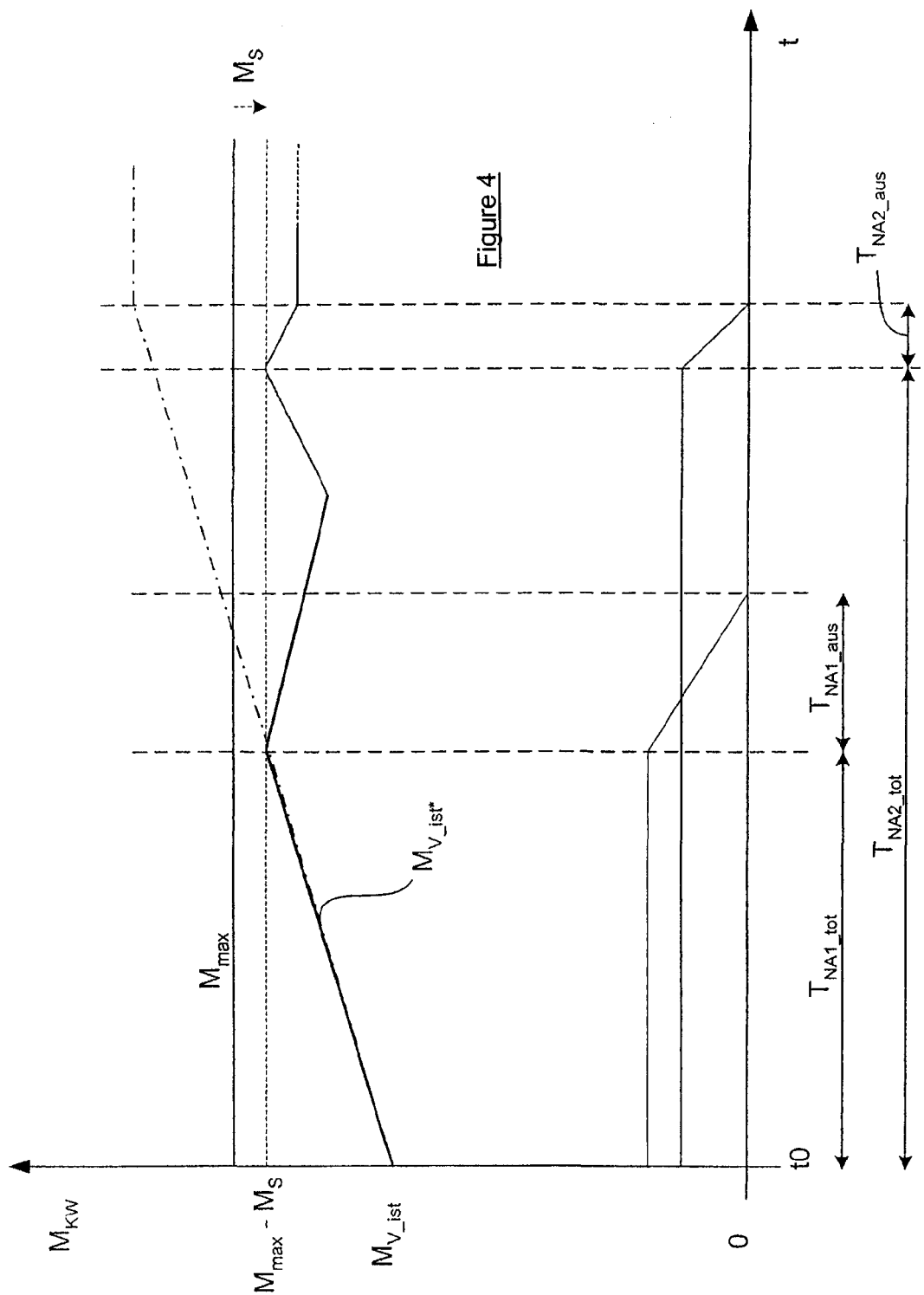
FIG. 4 shows the mode of operation in a refinement of the embodiment illustrated in FIG. 3.

This state is counteracted early by the method according to the present invention for controlling deactivatable secondary assemblies NA1, . . . , NAn, whose mode of action is discussed in greater detail in the course of the description of FIGS. 3 and 4. For this purpose, the current total loss torque $M_{V\_ist}$ of all secondary assemblies NA; NA1, . . . , NAn acting on the drivetrain and the deactivation dead time $T_{NA\_tot}$ of the at least one deactivatable secondary assembly NA1, . . . , NAn are ascertained, the total loss torque $M_{V\_ist*}$ foreseeably existing after passage of the deactivation dead time $T_{NA\_tot}$ is estimated, this total loss torque $M_{V\_ist*}$ foreseeably existing after passage of the deactivation dead time $T_{NA\_tot}$ is compared to a predefined maximum total loss torque (maximum torque threshold $M_{max}$) and if the predefined maximum torque threshold $M_{max}$ is exceeded by the estimated total loss torque $M_{V\_ist*}$, the deactivation of the at least one deactivatable secondary assembly NA1, . . . , NAn is instigated.

FIG. 3 illustrates a deactivation strategy in which, in the case of only a single deactivatable secondary assembly, its deactivation dead time $T_{NA\_tot}$, or in the case of multiple deactivatable secondary assemblies NA1, . . . , NAn, the deactivation dead time $T_{NA\_tot}$ of the secondary assembly having the shortest deactivation dead time $T_{NA\_tot}$ (identified in the following as $T_{NA1\_tot}$) may be used as the basis for ascertaining the torque curve during this deactivation dead time $T_{NA1\_tot}$. A deactivation of the "single" (single deactivation dead time) or the "fastest" (shortest deactivation dead time) secondary assembly occurs if the current loss torque of the secondary assemblies plus the predicted (estimated) loss torque of the secondary assemblies NA; NA1, . . . , NAn in relation to the shortest deactivation dead time $T_{NA1\_tot}$ reaches or exceeds the predefined maximum torque threshold $M_{max}$.

As shown in FIG. 3, the deactivation dead time $T_{NA\_tot}$ of the fastest secondary assembly is, for example, $T_{NA1\_tot}$ =150 ms. Starting from the current total loss torque $M_{V\_ist}$ of all active secondary assemblies NA; NA1, . . . , NAn at time t0, for example, according to a linear function, the torque curve to be expected is calculated over the deactivation dead time $T_{NA1\_tot}$. This calculation is performed progressively in a time interval of, for example, 10 ms, which is significantly shortened in comparison to the shortest deactivation dead time $T_{NA\_tot}$. As soon as the maximum torque threshold $M_{max}$ is reached by the fictive total loss torque $M_{V\_ist*}$, at time t0, the deactivation command is generated for the secondary assembly to be deactivated, whose deactivation dead time $T_{NA\_tot}$ was used as the basis of the calculation of the fictive total loss torque $M_{V\_ist*}$. After passage of the deactivation dead time $T_{NA\_tot}$, the actual deactivation of the secondary assembly is initiated. The actual deactivation behavior is also assumed as idealized here by a linear curve, so that the secondary assembly to be deactivated is completely deactivated after passage of the deactivation dead time $T_{NA\_tot}$ and subsequent deactivation time $T_{NA-aus}$ (loss torque of the deactivated secondary assembly=0).

The maximum torque gradient of the particular secondary assembly may be ascertained from the actual deactivation behavior of the secondary assembly during the deactivation time (see slope of the deactivation flank). Both the maximum torque gradient and also the maximum loss torque absorbable by the particular secondary assembly (which are required in addition to the current loss torque of the particular secondary assembly to calculate the fictive total loss torque) may be stored for each individual deactivatable secondary assembly in operation maps based on the current environmental and operating conditions U, B. In the exemplary embodiment shown, the current maximum torque of the drive unit 2 minus a torque difference as the torque security reserve $M_S$ may be used as the maximum torque threshold $M_{max}$ for the method according to the present invention.

FIG. 4 shows a refinement of the present invention, in which the deactivation dead time $T_{NA2\_tot}$ of a secondary assembly which is deactivatable more slowly is used as the basis for the estimation of the fictive total loss torque $M_{V\_ist*}$ after passage of the deactivation dead time $T_{NA\_tot}$. The slower secondary assembly is deactivated if the torque balance is negative in relation to its deactivation dead time $T_{NA2\_tot}$. As illustrated in the embodiment according to FIG. 4, it may be incorporated in this torque balance that the loss torque of a faster secondary assembly (secondary assembly which is deactivatable faster) would then already be released (the faster secondary assembly would already have been deactivated).

Existing information about secondary assemblies on the basis of torque estimation is optimally used by the method according to the present invention and possible incorrect deactivations of secondary assemblies are effectively avoided. Furthermore, coordinated deactivation of the secondary assemblies with a torque load on the drivetrain is implemented in a simple way—without using additional costly hardware.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling secondary assemblies of a motor vehicle, the motor vehicle having at least one deactivatable secondary assembly which generates a loss torque, the method comprising:
   determining a current total loss torque acting on a drivetrain of the vehicle,
   determining a deactivation dead time of the at least one deactivatable secondary assembly;
   estimating a total loss torque resulting after passage of the deactivation dead time; and deactivating the at least one deactivatable secondary assembly, if a predefined maximum torque threshold is exceeded by the estimated total loss torque.

2. The method according to claim 1, wherein a current drive torque of a drive unit of the motor vehicle driving the drivetrain is ascertained and the maximum torque threshold is determined as a function thereof.

3. The method according to claim 1, wherein the total loss torque is estimated as a function of at least one of a current loss torque of all secondary assemblies, a maximum loss torque of all active secondary assemblies and a maximum torque gradient of each active secondary assembly.

4. The method according to claim 1, wherein, if at least two deactivatable secondary assemblies having different deactivation dead times are provided, the secondary assembly having a shorter deactivation dead time is deactivated if the total loss torque composed of the current total loss torque and an estimated loss torque of the secondary assembly exceeds a predefined maximum torque threshold during the shorter deactivation dead time.

5. The method according to claim 1, wherein, if at least two deactivatable secondary assemblies having different deactivation dead times are provided, the secondary assembly having a longer deactivation dead time is deactivated if the total loss torque composed of the current total loss torque and estimated loss torque of the secondary assembly exceeds the predefined maximum torque threshold during the longer deactivation dead time.

6. The method according to claim 5, wherein the total loss torque is estimated after passage of the longer deactivation dead time, taking into consideration a possible estimation of a deactivatable secondary assembly having a shorter deactivation dead time.

7. The method according to claim 2, wherein the total loss torque is estimated as a function of at least one of a current loss torque of all secondary assemblies, a maximum loss torque of all active secondary assemblies and a maximum torque gradient of each active secondary assembly.

8. The method according to claim 2, wherein, if at least two deactivatable secondary assemblies having different deactivation dead times are provided, the secondary assembly having a shorter deactivation dead time is deactivated if the total loss torque composed of the current total loss torque and an estimated loss torque of the secondary assembly exceeds a predefined maximum torque threshold during the shorter deactivation dead time.

9. The method according to claim 2, wherein, if at least two deactivatable secondary assemblies having different deactivation dead times are provided, the secondary assembly having a longer deactivation dead time is deactivated if the total loss torque composed of the current total loss torque and estimated loss torque of the secondary assembly exceeds the predefined maximum torque threshold during the longer deactivation dead time.

10. The method according to claim 9, wherein the total loss torque is estimated after passage of the longer deactivation dead time, taking into consideration a possible estimation of a deactivatable secondary assembly having a shorter deactivation dead time.

11. The method according to claim 3, wherein, if at least two deactivatable secondary assemblies having different deactivation dead times are provided, the secondary assembly having a shorter deactivation dead time is deactivated if the total loss torque composed of the current total loss torque and an estimated loss torque of the secondary assembly exceeds a predefined maximum torque threshold during the shorter deactivation dead time.

12. The method according to claim 3, wherein, if at least two deactivatable secondary assemblies having different deactivation dead times are provided, the secondary assembly having a longer deactivation dead time is deactivated if the total loss torque composed of the current total loss torque and estimated loss torque of the secondary assembly exceeds the predefined maximum torque threshold during the longer deactivation dead time.

13. The method according to claim 12, wherein the total loss torque is estimated after passage of the longer deactivation dead time, taking into consideration a possible estimation of a deactivatable secondary assembly having a shorter deactivation dead time.

14. A system for controlling secondary assemblies of a motor vehicle, comprising:
at least one deactivatable secondary assembly which generates a loss torque; and
a control unit operatively configured to
determine a current total loss torque acting on a drivetrain of the vehicle,
determine a deactivation dead time of the at least one deactivatable secondary assembly,
estimate a total loss torque resulting after passage of the deactivation dead time, and
deactivate the at least one deactivatable secondary assembly, if a predefined maximum torque threshold is exceeded by the estimated total loss torque.

* * * * *